US005667164A

United States Patent [19]

Yamamoto

[11] Patent Number: 5,667,164

[45] Date of Patent: Sep. 16, 1997

[54] DEVICE AND METHOD FOR FEEDING A SHEET

[75] Inventor: Takaharu Yamamoto, Kyoto, Japan

[73] Assignee: Dainippon Screen Mfg. Co., Ltd., Kyoto, Japan

[21] Appl. No.: 553,944

[22] Filed: Nov. 6, 1995

Related U.S. Application Data

[63] Continuation of Ser. No. 364,032, Dec. 23, 1994, abandoned, which is a continuation of Ser. No. 32,584, Mar. 17, 1993, abandoned.

[30] Foreign Application Priority Data

Mar. 30, 1992 [JP] Japan .................................... 4-074702

[51] Int. Cl.$^{6}$ .......................... B65H 20/02; B65H 20/20; G01D 15/24; G03B 27/58

[52] U.S. Cl. ....................... 242/564.4; 242/422; 226/187; 346/136; 355/47; 355/48

[58] Field of Search .................................... 242/419, 422, 242/564.4; 226/181, 186, 187, 183; 355/47, 48, 50; 346/136

[56] References Cited

U.S. PATENT DOCUMENTS

| | | | |
|---|---|---|---|
| 3,073,590 | 1/1963 | Romeo et al. | 226/187 X |
| 3,161,362 | 12/1964 | Smith, II | 226/183 X |
| 3,330,458 | 7/1967 | Bentzman | 226/187 X |
| 4,165,029 | 8/1979 | Mitchell | 226/183 X |
| 4,534,498 | 8/1985 | Nilsson | 226/181 |
| 4,604,632 | 8/1986 | Matsumoto | 346/136 X |
| 4,642,659 | 2/1987 | Nagashima et al. | 346/76 PH |
| 4,707,712 | 11/1987 | Buckley et al. | 346/136 |
| 4,884,085 | 11/1989 | Ozawa et al. | 346/136 |

FOREIGN PATENT DOCUMENTS

| | | | |
|---|---|---|---|
| 2804116A1 | 8/1978 | Germany . | |
| 54-68608 | 6/1979 | Japan | 226/183 |

*Primary Examiner*—John Q. Nguyen
*Attorney, Agent, or Firm*—Lowe, Price, LeBlanc & Becker

[57] ABSTRACT

The axial length of a center roller (subroller) (30) is made shorter than the axial length of a main roller (28), and the center roller (30) is placed so that an axis of the center roller (30) is parallel to an axis of the main roller (28) in a base position and so that a nipping pressure is generated in the center position in the axial direction of the main roller (28). A film (sheet) (20) is thereby subjected to a tension in the center portion thereof due to the pulling force of the center roller (30), and the feeding amounts of the film (20) at the left and right portions therefore vary relative to each other. The film (20) thus displaces in the axial direction of the main roller (28) around the center roller (30).

10 Claims, 15 Drawing Sheets

FIG. 11A
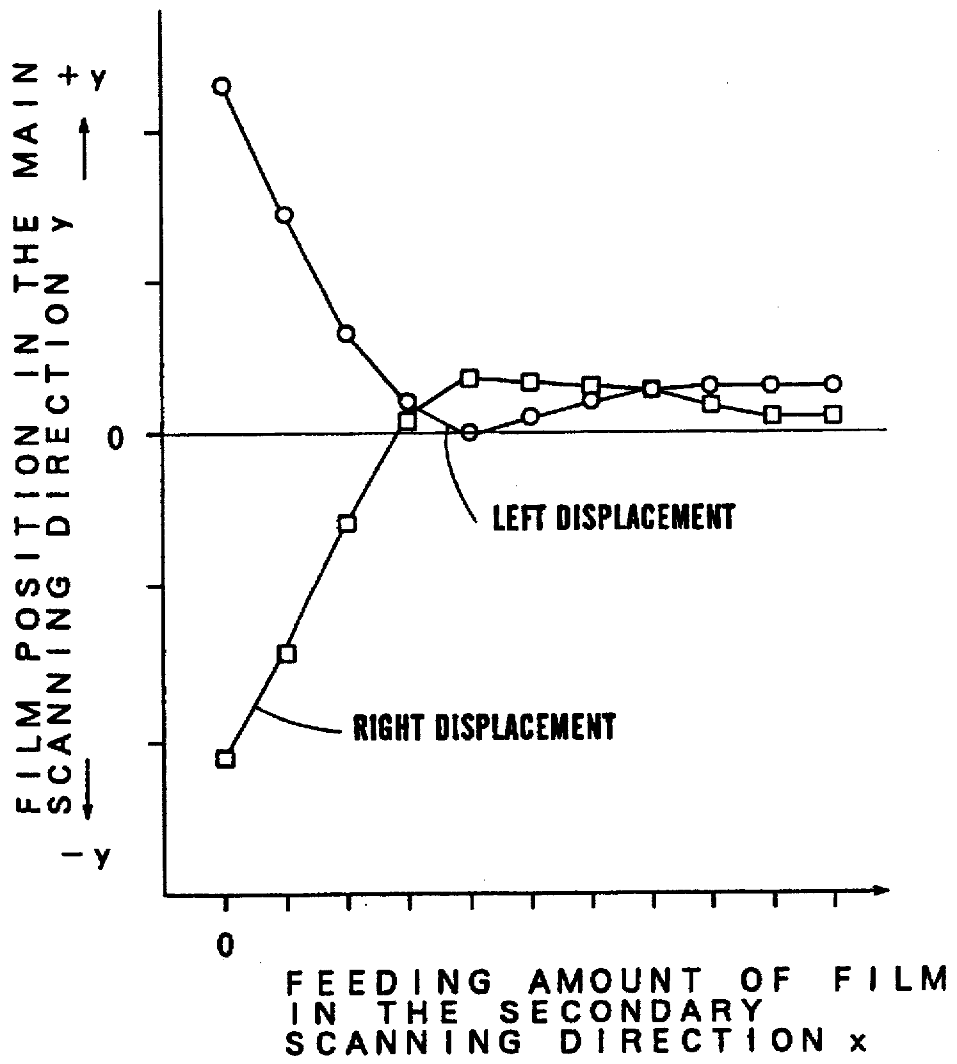
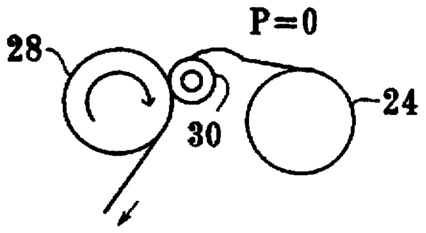
FIG. 11B

FIG. 12A
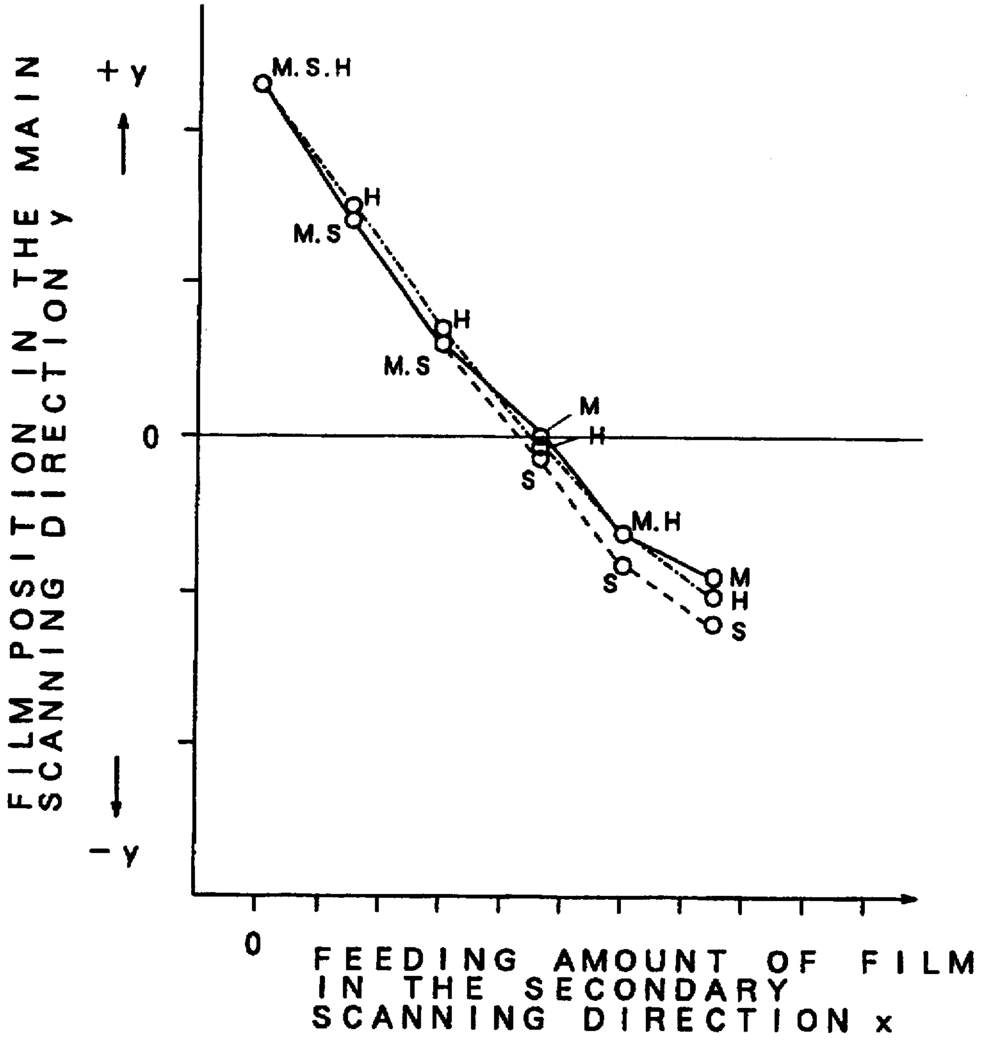
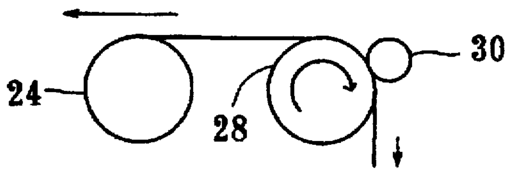
FIG. 12B

FIG. 13A
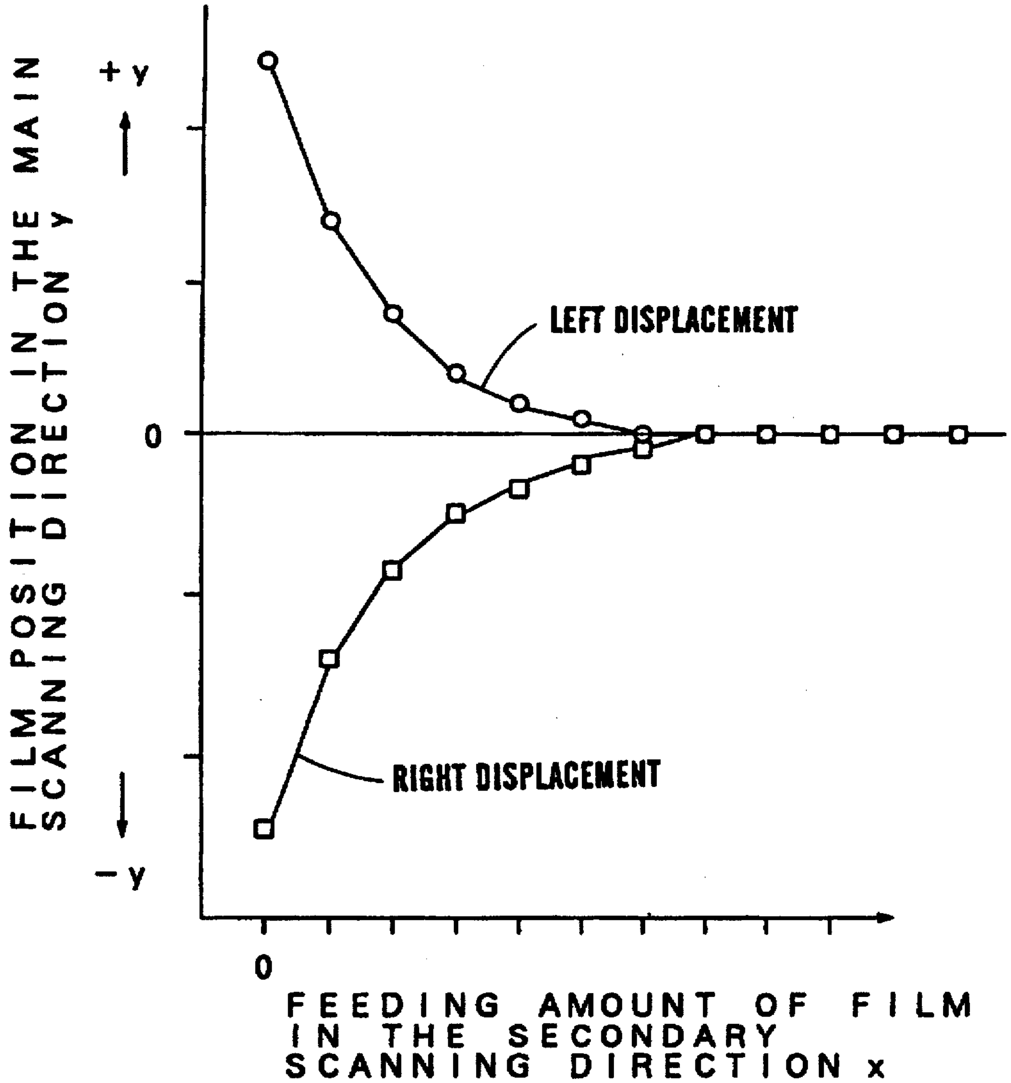
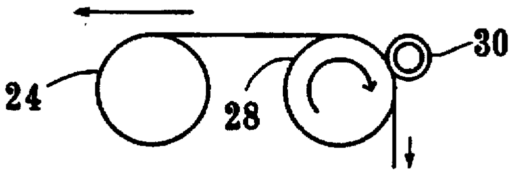
FIG. 13B

FIG. 14A
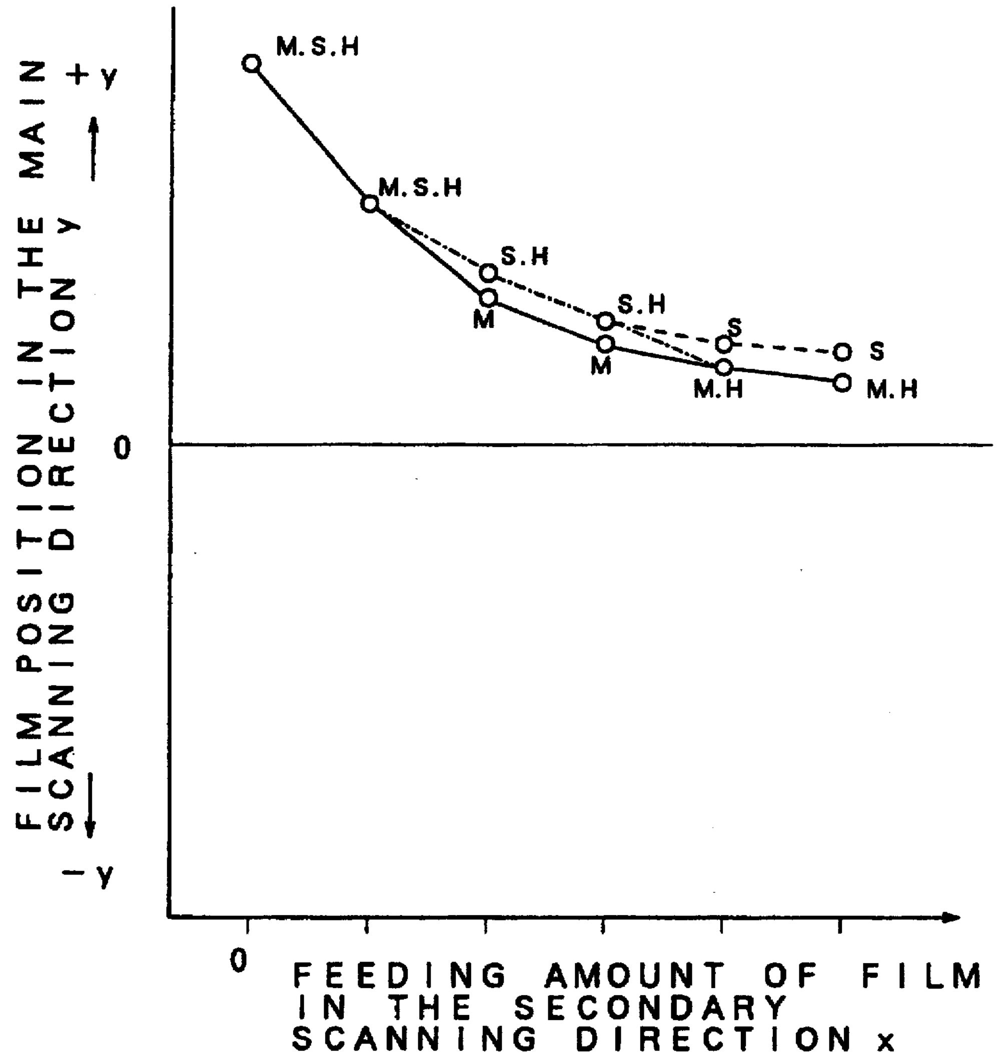
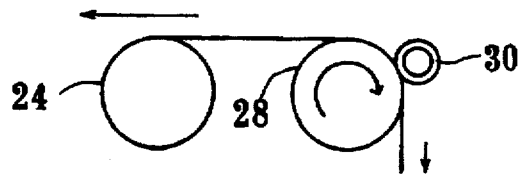
FIG. 14B

FIG. 15A
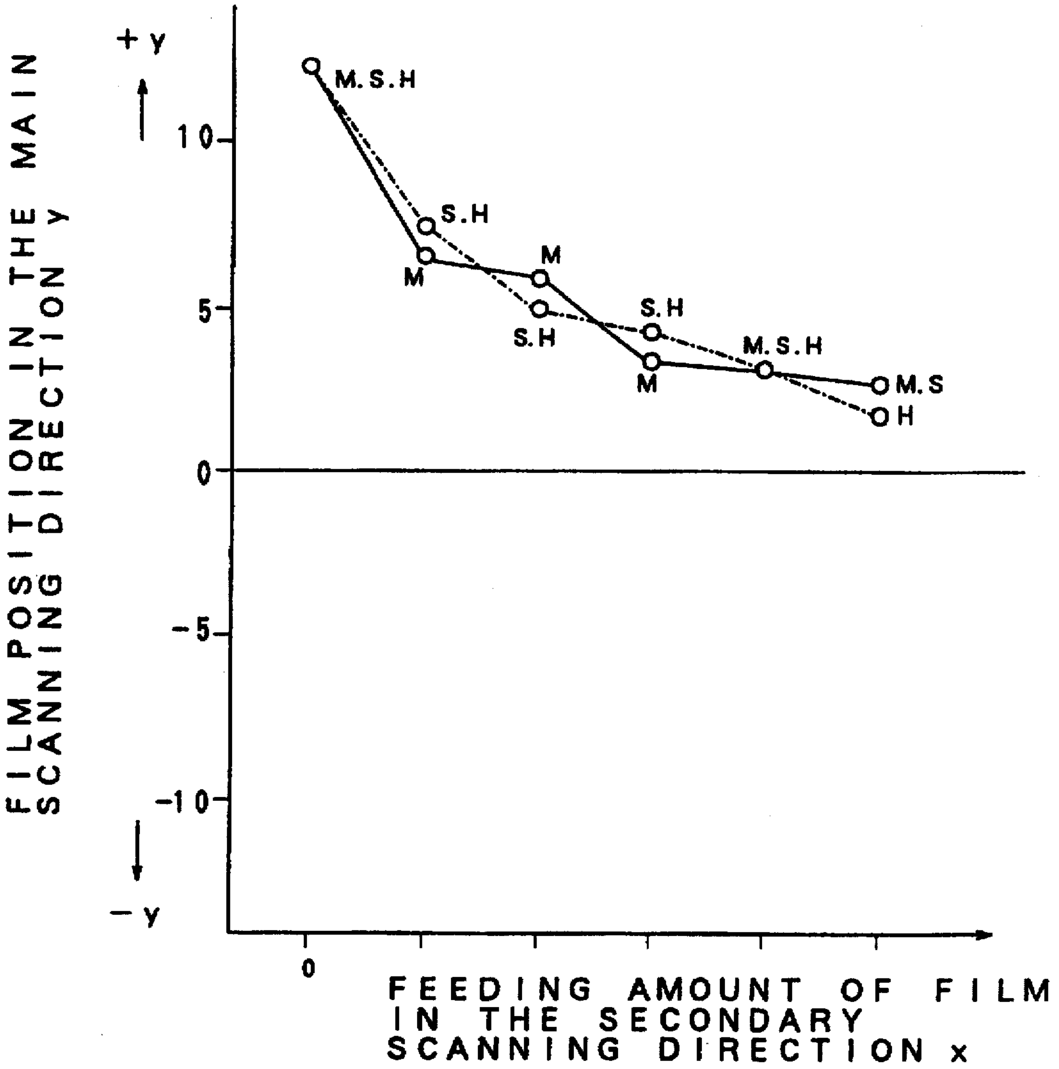
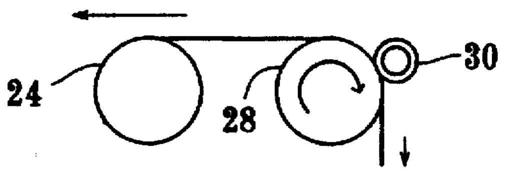
FIG. 15B

FIG. 16A
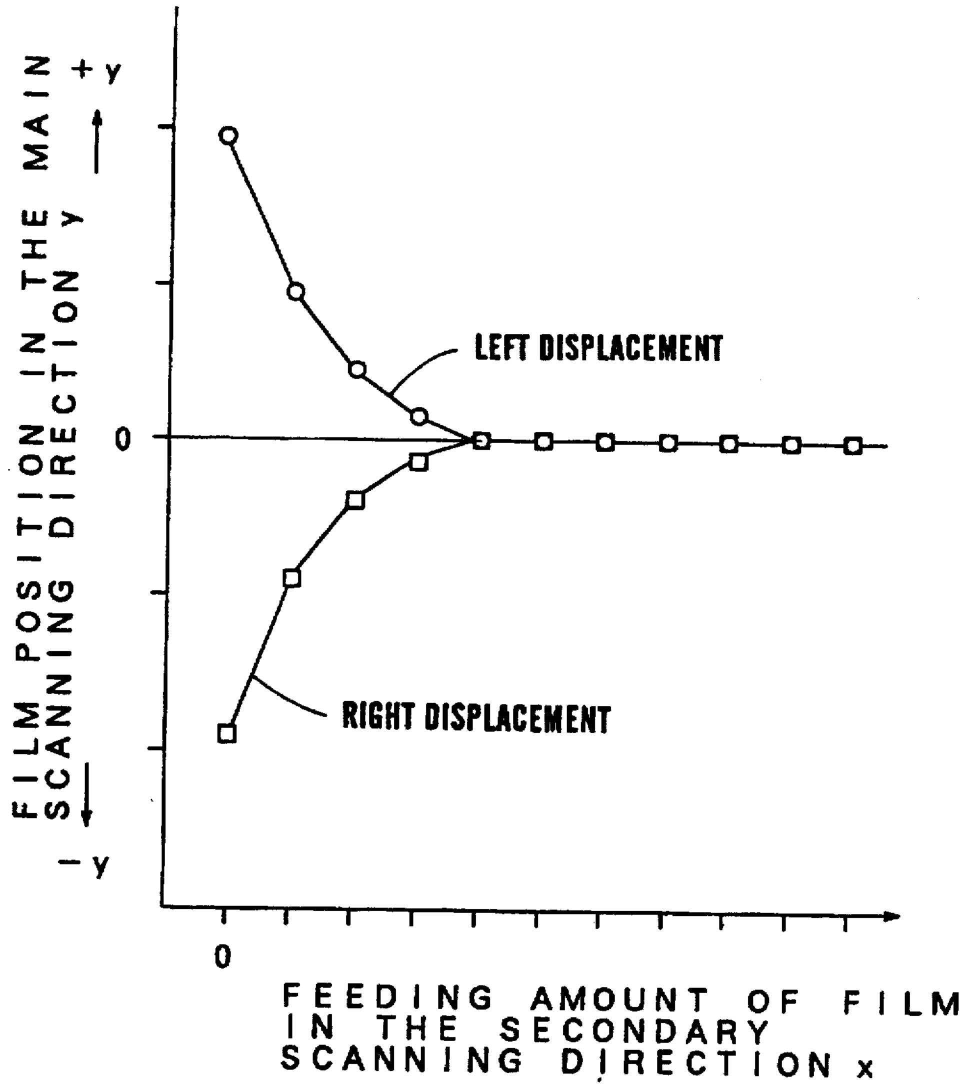
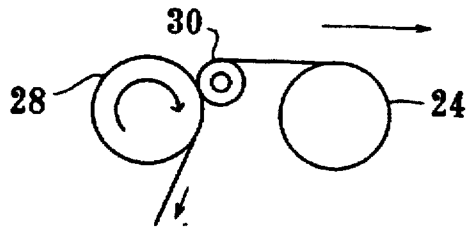
FIG. 16B

DEVICE AND METHOD FOR FEEDING A SHEET

This application is a continuation of application Ser. No. 08/364,032 filed Dec. 23, 1994 abandoned, which is a continuation of application Ser. No. 08/032,584, filed Mar. 17, 1993, now abandoned.

BACKGROUND OF THE INVENTION

1. Field of the invention

The present invention relates to a device and a method for feeding a sheet or sheet-like material, for example, a film which is used in a flat-bed type scanner, an image setter for producing a printing prepress, and the like, in order to record by exposure.

2. Description of the Prior Art

An example of a flat-bed type scanner having a conventional sheet feeding device is shown in FIG. 1. A magazine 4 houses a roll film 6 made by winding up a film 2 which is a kind of sheet. A film 2 rewound from the roll film 6 is fed to a position between a main roller 8 and a nip roller (subroller) 9 through a film guide 10. The main roller 8 is rotated by a drive of an electric motor (not shown). The main roller 8 and the nip roller 9 grip the film 2 between themselves and feed the film 2 in the secondary scanning direction S. Under the situation, the film 2 on the main roller 8 is scanned in the main scanning direction M with a light beam from an optical system 12 on the basis of an original image data, and then, a reproduced image is obtained on the exposed film 2.

In the above exposure step, high film feeding accuracy and high positioning accuracy of the reproduced image are required. Therefore, a back tension is loaded on the film by applying load resistance to the roll film 6. And by virtue of the back tension, a contacting force between the film 2 and the main roller 8 is increased so as to keep the feeding accuracy of the film 2 and the positioning accuracy of the reproduced image.

However, oblique or diagonal running of the film 2 and weaving or meandering of the film 2 cannot be sufficiently prevented by merely applying the back tension. FIGS. 2A and 2B are views of a film 2 shifting the self position due to the oblique running and the weaving, respectively. FIG. 2A shows an oblique running of the film 2 in which the film 2 is inclined at an angle $A_1$ of $\alpha°$ with the secondary scanning direction. Further, FIG. 2B shows the film 2 weaves where the center O' of the film 2 moves in the course of width of $2\beta$ relative to the center O of the main roller 8. The line $\gamma$ is a locus of the center O' of the film 2.

The above mentioned oblique running and weaving of the film 2 have a great influence on the pattern of the reproduced image. For example, under the condition of the oblique running of FIG. 2A, an original image of a rectangular pattern is reproduced to a reproduced image of a rectangular pattern inclining at an angle $A_1$ of $\alpha°$ with respect to the scanning direction as shown in FIG. 3. And if the weaving of FIG. 2B is further added to such condition, the reproduced image becomes to a warped rectangular form having curved sides 90 as shown in FIG. 4.

Under the above mentioned conditions, any normal reproduced image pattern cannot be obtained. Therefore, the film 2 is required to be returned back to the center in the main scanning direction, and should be arranged so that the film 2 is in parallel with the secondary scanning direction or has the angle $A_1$ of zero and so that the center O' meet with the center O as shown in FIGS. 2A and 2B.

Therefore, for example, in such case that the oblique running or weaving arises, the film 2 is released at once, and is reset by feeding the forwarding portion of the film 2 toward the main roller 8 through the film guide 10. By virtue of the above-mentioned resetting, the positioning aberration or twist of the film 2 can be corrected by the self weight.

As mentioned above, in the conventional devices, aberrations due to the oblique running and weaving must be corrected by such manner during the sheet feeding.

However, such conventional sheet feeding device has problems as follows.

When the object to be fed is a short film, the influence of oblique running is not so great, even if merely initial correction by self weight is performed. For example, if an error of the initial correction causes an oblique running of 1 mm per 1 m, the aberration for feeding of a film of 1 m is in an approvable range. Therefore, such manner of initial correction does not raise any problem.

However, the oblique running provides aberration increasing in proportion to the feeding length. Therefore, for a long film, e.g. 10 m in length, the aberration due to the an oblique running becomes to an extent of 10 mm. Since the positioning aberration of 10 mm is over the approvable range, the position accuracy of the reproduced image cannot be kept well. Therefore, in a case of feeding of a long film, the initial correction should be more accurately performed.

Further, the initial correction by the self weight receives influence of the initial condition of the film 2, e.g. condition of curl of the film 2, influence of the contact with the film guide 10, and the like. Therefore, the position determined by the initial correction itself tends to disperse and lacks accuracy.

In order to eliminate the above problem, some correcting devices having more complicated mechanism might be employed. However, such correcting device rises another problem that cost and space increase.

The above mentioned problem is regarded as important in a color image setter for a color DTP(desk top publishing) device. The color image setter continuously records reproduced images for four colors, i.e. Y(yellow), M(magenta), C(cyan) and K(black) by exposure, and the size for each color image is large. Therefore, the film used for one exposing scanning is very long, and high feeding accuracy is required. Further, a small-sized color image setter like a business machine is also required.

SUMMARY OF THE INVENTION

The object of the present invention is to solve the above problems and to provide a sheet feeding device in which correction of the oblique of sheet can be easily and accurately performed.

According to one aspect of the present invention, there is provided a device for feeding a sheet, comprising the following elements.

A main roller for feeding a sheet in a direction substantially perpendicular to an axial direction thereof;

a subroller placed so that an axis of the subroller is substantially parallel to an axis of the main roller, for gripping the sheet together with the main roller; and a tension means for applying a tension in a direction opposite to the feeding direction to the sheet; wherein the subroller having an axial length sufficiently shorter than axial length of the main roller, and the subroller being placed in a center portion in axial direction of the main roller so as to apply a nipping pressure to the main roller.

According to another aspect of the present invention, there is provided a method for feeding a sheet, comprising the following characteristics.

A method for feeding a sheet from a roll film comprising step of:

a) applying a back tension to the sheet b) feeding the sheet in a direction substantially perpendicular to an axial direction of a main roller c) holding the sheet between the main roller and a subroller which is placed so that an axis of subroller is substantially parallel to an axis of the main roller d) applying a nipping pressure "P" to the main roller with the subroller which has an axial length sufficiently shorter than an axial length of main roller and is placed in a center portion in axial direction of the main roller.

BRIEF DESCRIPTION OF THE DRAWINGS

FIG. 11 is a view showing experimental data where back tension is not applied;

FIG. 12 is a view showing experimental data where a long center roller is used;

FIG. 13 is a view showing experimental data where a short center roller is used;

FIG. 14 is a view showing experimental data where nipping pressure and feed speed are varied;

FIG. 15 is a view showing experimental data where nipping pressure and feed speed are varied; and FIG. 16 is a view showing experimental data where the film feeding device has a short center roller which is between the main roller and the roll film.

DETAILED DESCRIPTION OF THE INVENTION

Figure 5:
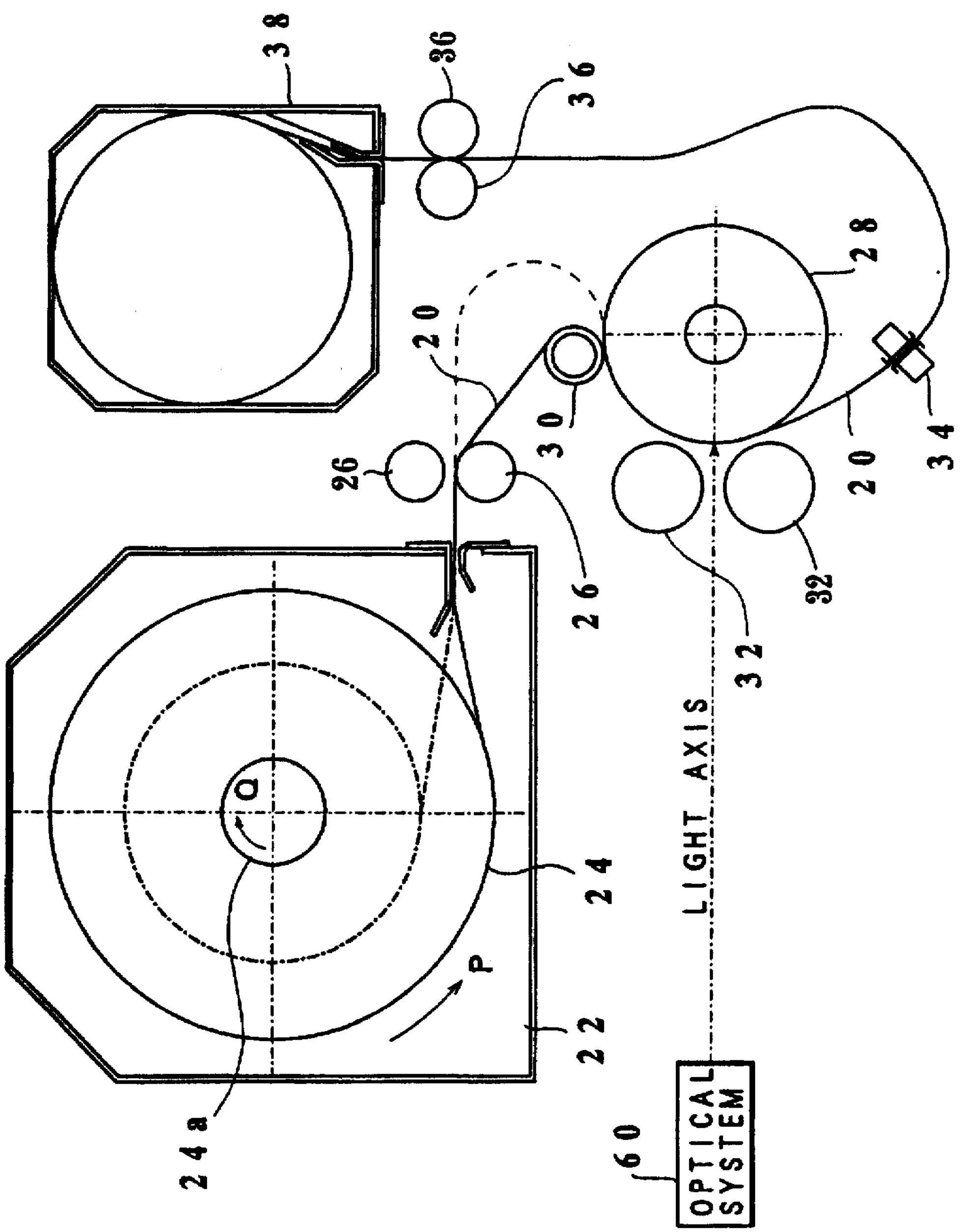
FIG. 5 is a view showing a construction of an image setter including an embodiment of a film feeding device of the present invention.
Figure 6:
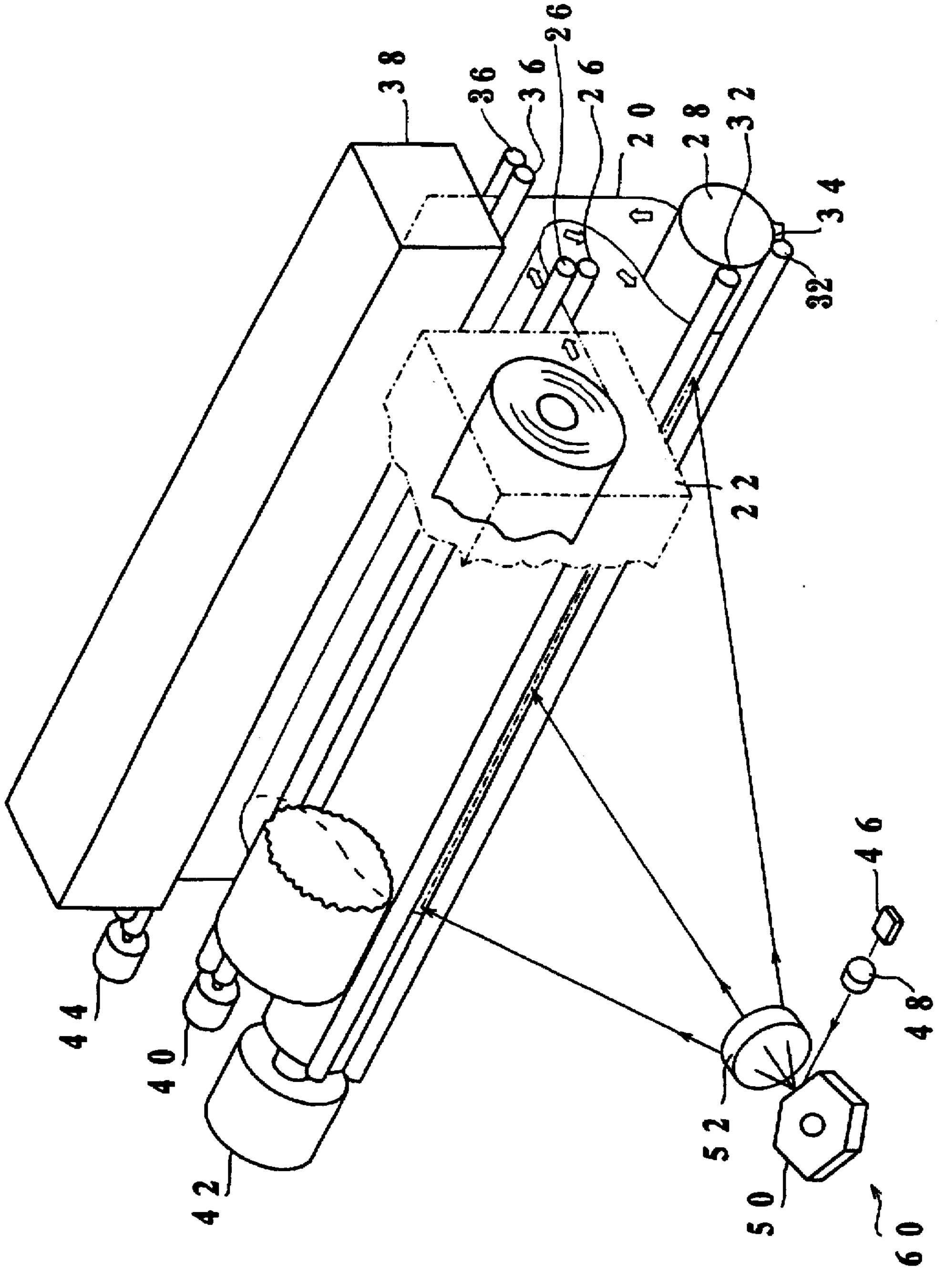
FIG. 6 is a schematic perspective view of the above mentioned image setter.

FIG. 5 is a sectional view of an image setter including a sheet feeding device which is an embodiment of the present invention. FIG. 6 is a perspective view of the image setter. A roll film 24 made by rolling up a film 20, which is a sheet, is housed in a magazine 22. Introducing rollers 26 are rotated by drive of an electric motor 40, and draw the film 20 from the magazine 22. A main roller 28 rotates by virtue of drive of an electric motor 42, and the main roller 28 grips the film drawn from the introducing rollers 26 and feeds the film 20 in the secondary direction, together with a center roller 30 which is a subroller.

Figure 7:
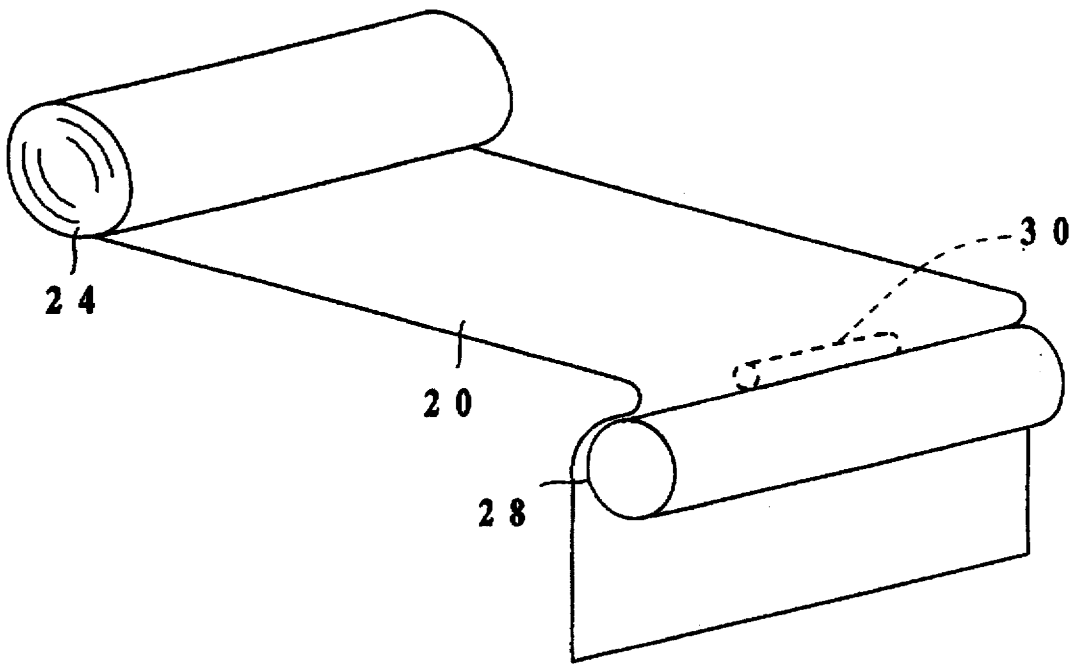
FIG. 7 is a view showing an arrangement of a center roller (subroller)
Figure 8A:
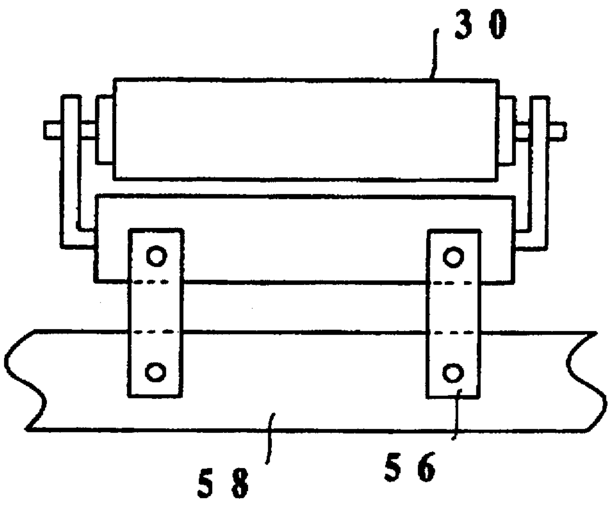
FIG. 8A is a view showing the construction of the center roller (subroller)
Figure 8B:
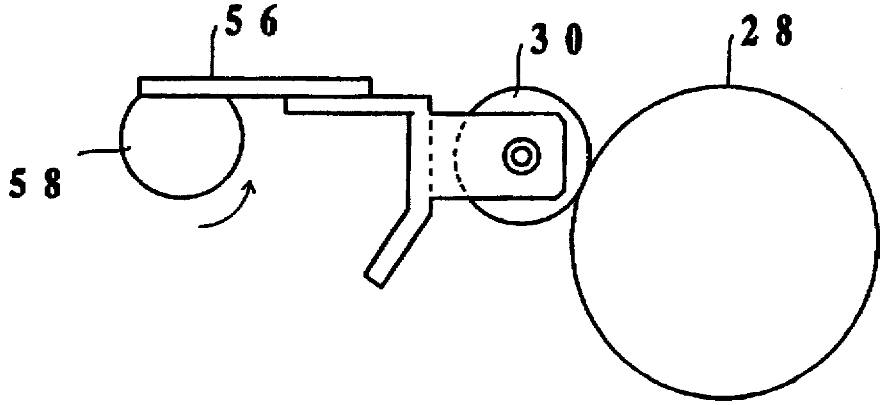
FIG. 8B is a view showing the center roller (subroller) being in contact with a main roller.

Referring to FIG. 7, the center roller 30 is made shorter in axial length than the main roller 28 and is placed so that an axis of the center roller 30 is parallel to an axis of the main roller 28 and so that a nipping pressure is applied in the center portion in the axial direction of the main roller 28. As shown in FIGS. 8 and 8B, the nipping pressure is provided by urging force of leaf springs 56 which are attached to a rotary shaft 58. Cross springs or the like can take place for the leaf springs.

Nip rollers 32 are arranged parallel with the main roller 28. Then, the nip rollers 32 closely urge the film 20 to the main roller 28, when the film 20 is fed to be exposed. Under the situation, the film 20 fitting over the main roller 28 is exposed through an optical system 60 having a light source 46, a lens 48, a deflector 50 and a scanning lens 52. After the exposure, the film 20 is cut by means of a cutter 34 and is collected into a collection box 38 by means of dispensing rollers 36 which are rotated by drive of an electric motor 44.

The sheet feeding device operates under a principle mentioned hereinafter. Assume that the center roller 30 is not used in the sheet feeding device. When the film 20 is fed rightly the film 20 has a tension distribution. But when there is oblique running or weaving of the film 20 the tension distribution changes.

Figure 9:
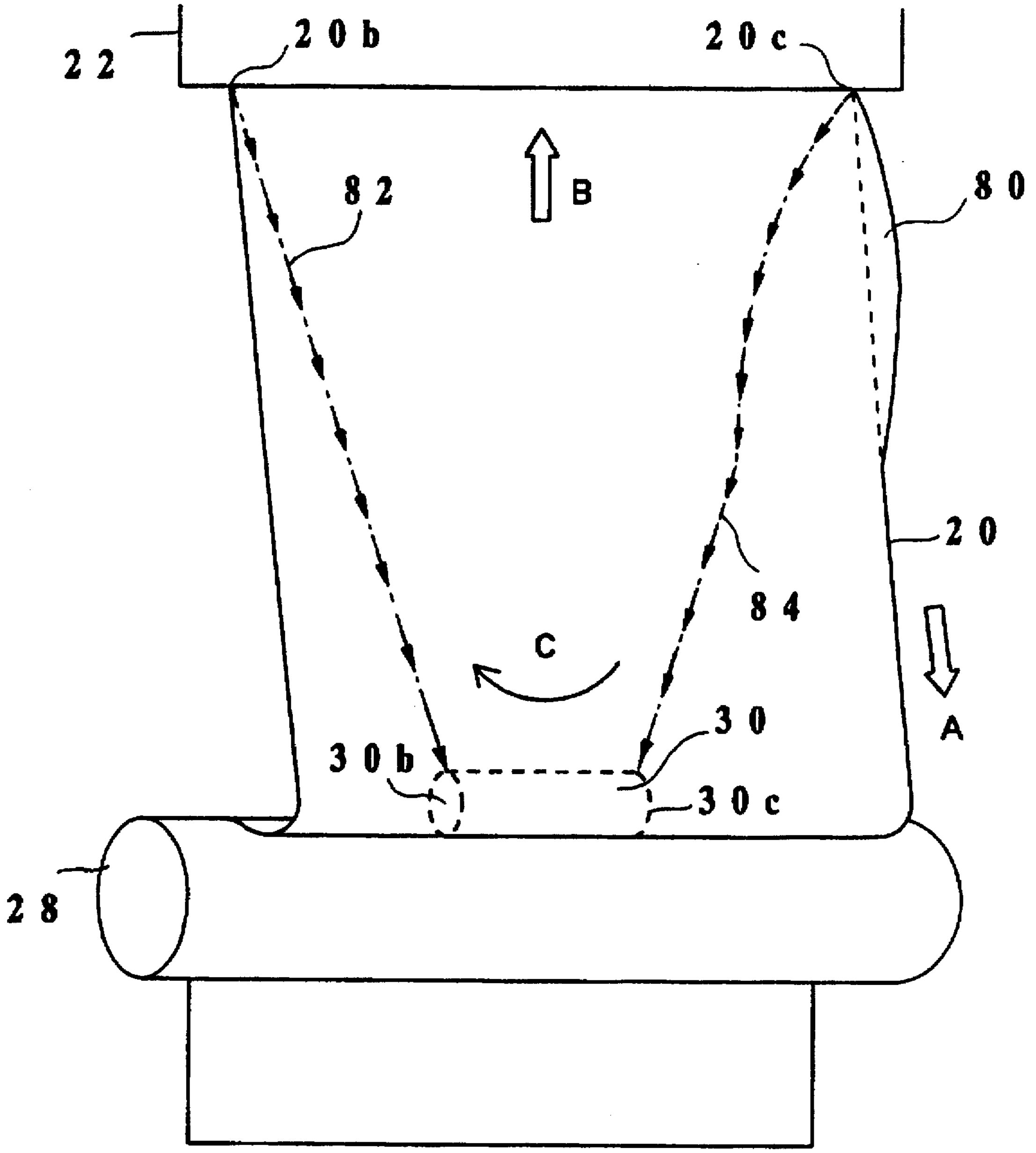
FIG. 9 is a view showing a floating state of a film (sheet)

In one case of oblique running, a floating portion 80 arises at the right side of film 20 as shown in FIG. 9. Then, when the center roller 30 is applied to this state, the center roller 30 causes two tensions in the film 20. One is a tension 82 in the film 20 between the end **30*b* of center roller 30 and a point 20*b* of the magazine 22 and the other is a tension 84 in the film 20 between the end 30*c* of center roller 30 and a point 20*c* of the magazine 22**.

In the above case, when the tension 82 from the left end **30*b* of the center roller 30 to the left side 20*b* of the film 20 is compared with the tension 84 from the right end 30*c* of center roller 30 to the right side 20*c* of the film, it can be understood that the right hand side tension 84 is smaller than the left side tension 82 since the floating portion 80** arises at the right hand side, and therefore, that there is difference between tensions of left and right sides.

Under the above condition, when the film 20 is fed in the direction A, the feeding length of the film 20 at the left side is different from that of the right side, according to the difference between the left tension 82 and the right tension 84. Meanwhile a rotary shaft **24*a* of the roll film 24 provides friction force Q to the rotating direction P as shown in FIG. 5, and therefore, the back tension in the direction B opposite to the direction A arises in the film 20. That is to say, in the present embodiment, the rotary shaft 24*a* functions as a tension means. The forwarding force in the direction A, the force in the direction B and the difference between the feeding length at left and right sides cause a force to shift or displace the film 20 in the center roller 30. That is, the film 20 takes a motion to displace in the direction of arrow mark C such that the floating portion 80 is deleted, i.e. the tension 82 becomes to the same as the tension 84**.

By virtue of the displacing force arising in the film 20 and the forwarding force in the direction A, the film 20 displaces and converges to such state that both left and right tensions 82 and 84 become the same, i.e. that the film 20 is directed to the direction perpendicular to the axial direction of the main roller 28.

Figure 1:
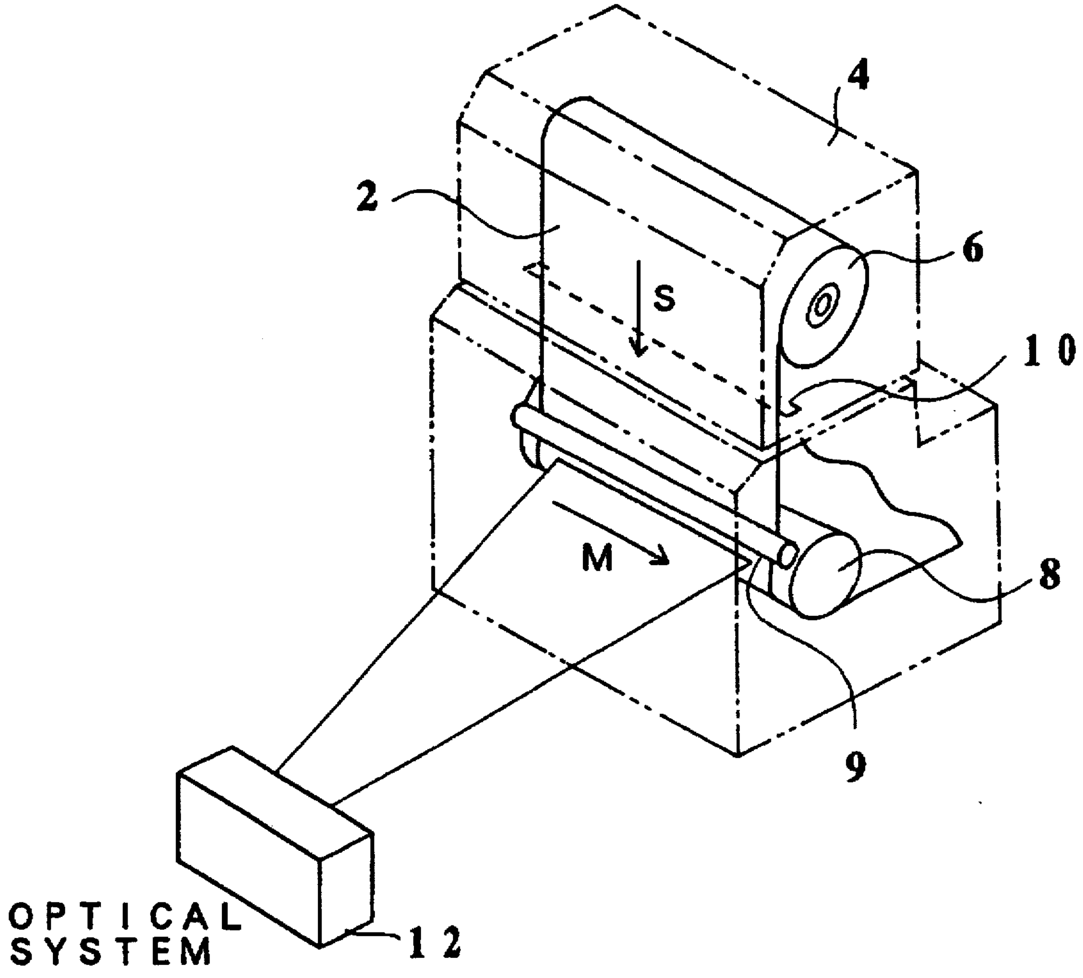
FIG. 1 (Prior Art)
FIG. 1 is a schematic view of a flat-bed type scanner including a conventional film feeding device.
Figure 2A:
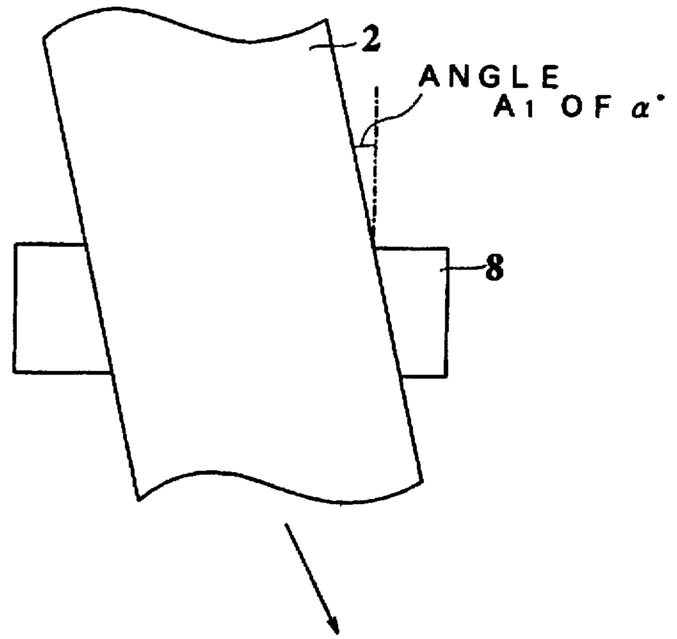
F I G. 2A (Prior Art)
FIG. 2A is a view showing a film running obliquely to a main roller.
Figure 2B:
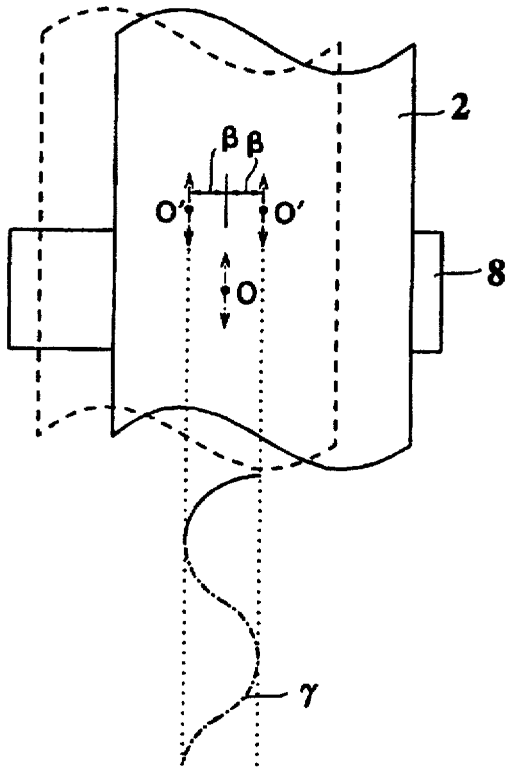
F I G. 2B (Prior Art)
FIG. 2B is a view showing a film running with weaving to a main roller.
Figure 3:
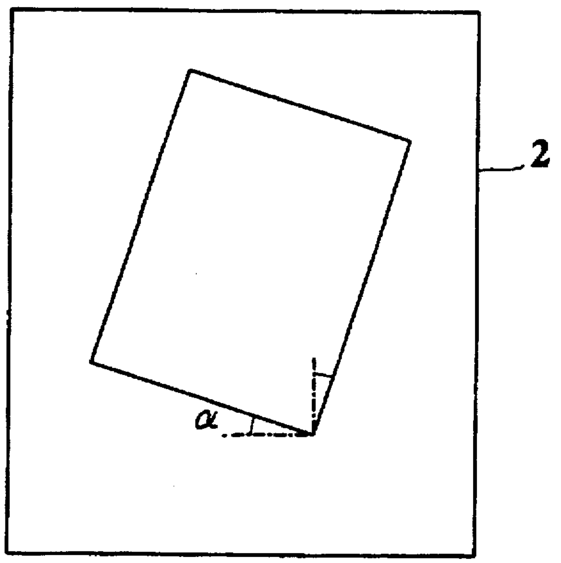
FIG. 3 (Prior Art)
FIG. 3 is a view showing an image pattern reproduced under oblique running.
Figure 4:
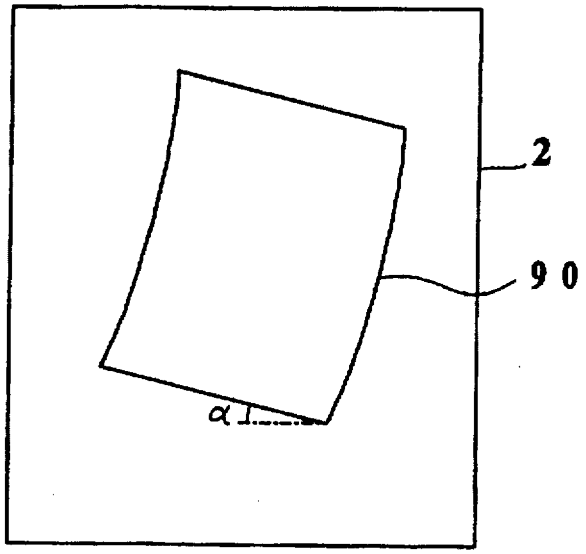
FIG. 4 (Prior Art)
FIG. 4 is a view showing an image pattern reproduced under weaving.

In another case of the oblique running by the angle $A_1$ of $\alpha°$ of the film 20 as shown in FIG. 2A, in which floating portion 80 does not arise yet, the operation goes as same as the above mentioned in a point that difference happens in the left and right tensions of film 20. Therefore, the obliquely running film 20 converges to the original secondary scanning direction such that the angle $A_1$ of $\alpha°$ becomes to the angle $A_1$ of zero, by virtue of the displacing force at the center roller 30.

Figure 10:
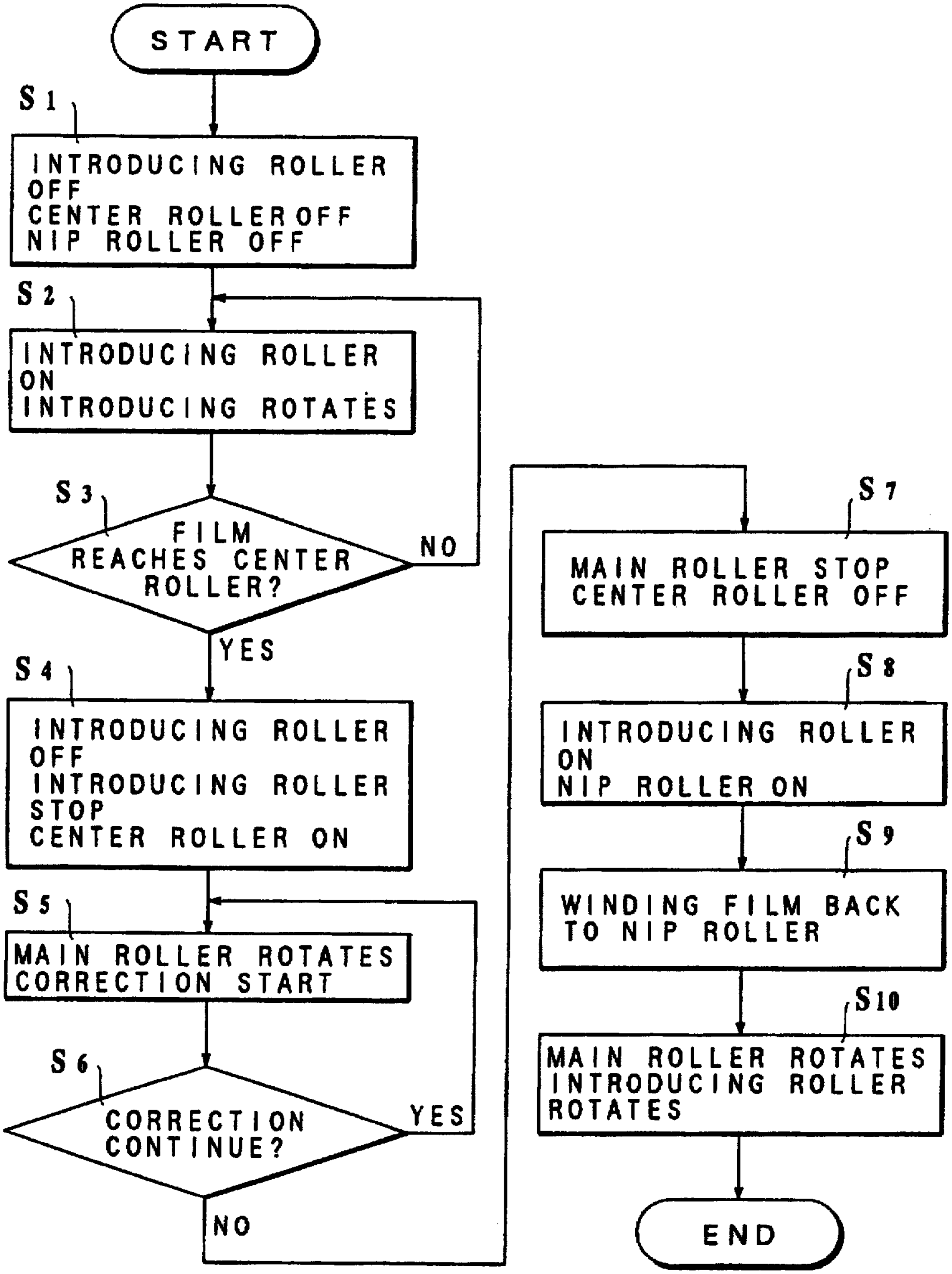
FIG. 10 is a flowchart of a process of correction for oblique running in the above mentioned image setter.

A flowchart of a process for correcting the oblique running according to the above-mentioned principle is shown an FIG. 10. Hereinafter, the operation of the device is explained with reference to FIG. 5, FIG. 6 and FIG. 10. At first, the introducing rollers 26 are turned OFF to release the mutual contact of the pair of introducing rollers 26, the center roller 30 is turned OFF to release the contact between the center roller 30 and the main roller 28, and the nip rollers 32 is turned OFF to release the contact between the nip roller 32 and the main roller 28. Then, an initial state is obtained (step S1).

At next step, the pair of introducing rollers 26 are turned ON so as to come in mutual contact, and the introducing rollers 26 are rotated (step S2). The film 20 is therefore drawn from the magazine 22. Then it is confirmed whether the forehead of the film 20 comes to a position which allows it to reach the center roller 30 or not (step S3). If the forehead of the film 20 does not reach the center roller 30, the film 20 is further drawn, by returning to the step S2.

If the forehead of the film 20 reaches the center roller 30, the introducing rollers 26 are turned OFF in order to stop the rotation thereof, the center roller 30 is turned ON so as to come in contact with the main roller 28 and to grip the film 20 (step S4). As a result, a condition that back tension can be applied on the film 20 when the main roller 28 is rotated at the next step S5 is obtained. That is, the preparation for correcting oblique running is completed.

At next step, the main roller 28 is rotated such that the main roller 28 and the center roller 30 grip and feed the film 20 (step S5). Then the operation of the correction for the oblique running starts.

Next, it is confirmed whether the correction of the oblique running should be continued or not (step S6). In case the correction of the oblique running is to be continued, that is, the film 20 does not be fed by a predetermined length yet, the process returns to step S5. In case the correction of the oblique running is no more required, that is, the film 20 is already fed by a predetermined length, the rotation of the main roller 28 is stopped and the center roller 30 is turned OFF to release the contact with the main roller 28 (step S7).

Next, the pair of introducing rollers 26 are turned ON and the pair of nip rollers 32 are also turned ON (step S8). Then the introducing rollers 26 and the main roller 28 are rotated in the inverse direction in order to wind back the film 20 until the forehead of the film returns to the lower end of the nip rollers 32 (step S9).

Then, the introducing rollers 26 and the main roller 28 are rotated in the normal direction in order to feed the film 20, and light exposure is started (step S10).

As explained above, in the device, since the center roller 30 is set as mentioned above, the center roller 30 causes a pull force on the film 20. The pull force of the center roller 30 displaces the film 20 obliquely running to such state that the film 20 takes a posture perpendicular to the axial direction of the main roller 28, that is, in the direction of secondary scanning. By virtue of this function, the running direction of the film 20 can be converged to the original secondary scanning direction. Therefore, the initial correction of an obliquely running film 20 can be easily and accurately performed, and positioning image can be secured even if the film 20 is long.

Various kinds of experimental data which were obtained through really performed experiments are shown in FIGS. 11 through 16. In those drawings, the abscissa shows the feed amount or length x of the film 20 in the main scanning direction, and the ordinate shows the film position y in the secondary scanning direction. The film position "y=o" in the main scanning direction corresponds to the center of the center roller 30. The expression of double circles mark of the center roller 30 in FIGS. 11 though 16 means that the center roller 30 is short, and the expression of a single circle mark means that the center roller 30 is long.

FIG. 11 shows experimental data obtained under the condition where the nipping pressure is 2 kg and the film 20 does not receive any back tension. In case the film receives no back tension, the film 20 almost converges, but the film 20 goes unsteadily as shown in the graph.

FIG. 12 shows experimental data obtained under the condition that the nipping pressure is 2 kg, the film 20 receives back tension, and the center roller 30 has an axial length longer than the width of the film 20, i.e. in case of conventional type of roller.

Under such condition where the axial length of the center roller 30 is longer than the width of the film, the film 20 converges little, even though the back tension applies.

In FIG. 13, there is shown experimental data under the condition where the nipping pressure of the center roller 30 is 2 kg, the film 20 receives back tension, and the axial length of the center roller 30 is shorter than the axial length of the main roller 28. That is to say, this case corresponds to the method of the present invention. In this example, the length of the center roller 30 is ⅐ the length of the main roller 28. In such case that the axial length of the center roller 30 is shorter than the axial length of the main roller 28, the film 20 rapidly converges.

On the basis of the experimental data of FIG. 12 and FIG. 13, it can be presumed as mentioned below. In case the axial length of the center roller 30 is the same as the axial length of the main roller, the tension 82 and 84 shown in FIG. 9 do not arise, and displacing force by the center roller 30 arise little. That is to say, since a force to maintain the feeding of the film 20 as it is, is larger than a force to displace the film 20, the film 20 converges little. Therefore, it is proved that a convergence of film 20 generates by making the axial length of the center roller 30 shorter than the axial length of the main roller 28.

Next, the experimental data obtained by varying nipping pressure and feeding speed in a state of FIG. 13, are shown in FIG. 14 and FIG. 15. When the nipping pressure (1 kg, 2 kg), and the feeding speed (S: low (3.5 mm/sec), M: middle (7 mm/sec), and H: high (14 mm/sec)) are varied, such variation has little influence on the convergence of the film. Therefore, it can be understood that any nipping pressure and any feeding speed are sufficient as far as the film 20 can be fed with friction force, in relation to the kind of material of the film 20.

Meanwhile, when a short center roller 30 is arranged as shown in FIG. 16, the convergence can be obtained. However, the method of FIG. 16 shows better convergence in comparison with the method of FIG. 13. The reason can be explained as below. That is to say, in FIG. 16, the arrangement enables a face-to-face contact of the film 20 with the outer surface of the center roller 30 which is between the main roller 28 and the roll of film 24. Therefore, by virtue of roll-in effect between the center roller 30 and the main roller 28, the film 20 does not tend to slip over the center roller 30. Then, stronger tension force or tension is caused there, the displacing force for the film 20 increases, and the tendency of convergence increases also.

Though the ratio of the axial length of the center roller 30 to the main roller 28 is (1:7) in the above embodiment, depending upon some experiences, it appears that such ratio should be between about (1:10) and about (1:2). If the ratio is extremely enlarged, although the tendency of convergence of the film 20 greatly increases, a problem about feeding might happen since the center roller 30 is too short. On the contrary, if the ratio is minimized, although no problem about feeding happen, the convergence of film 20 decreases. Further, since the conditions, e.g. kind and size of the film 20, nipping pressure and shape of the center roller 30 might be varied, it is to be understood that the ratio should not be limited in the above-mentioned extent.

Further, though a film is used as an object to be fed in the embodiment, any other thin and flexible sheet like material may also be used.

Further, though a straight roller is used as a center roller 30 in the above examples, a crowning roller with crowning-shape can be used.

As explained above, in the device of the present invention, the axial length of the center roller 30 is sufficiently shortened than the axial length of the main roller 28, and the center roller 30 is placed so that an axial of the center roller 30 is parallel to an axial of the main roller 28 in a base position, and so that a nipping pressure is generated in the center portion in the axial direction of the main roller 28. Therefore, if a film runs obliquely, the feeding length of the film 20 at the left and right portions becomes different with each other, and a force of restitution capable of displacing the film 20 in the direction perpendicular to the axial direction of the main roller 28, i.e. in the secondary scanning direction, can be obtained. As a result, the film 20 converges, as the film 20 is fed in the direction of secondary scanning.

Further, when the film 20 is in face-to-face contact with outer surface of the center roller 30, at upper stream of the opposing position of the main roller 28 and the center roller 30, the force of restitution increases due to the increase of the tension of film 20 at the center portion, and the convergence of the feeding direction of the film 20 further ensured.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A device for preventing sideways motion of a long sheet of film during feeding thereof from a roll of film, comprising:

a controllably driven main roller rotatably mounted for feeding the long sheet in a direction substantially perpendicular to a rotational axis of the main roller;

a subroller rotatably mounted so that a rotational axis of the subroller is substantially parallel to the rotational axis of the main roller to define a nip with the main roller so that the sheet is gripped in the nip between the subroller and the main roller at a predetermined pressure and positioned relative to a direction of feed of the long sheet from the roll for applying a force on the sheet to wrap the sheet arcuately around a portion of the surface of the subroller, the roller and subroller together solely drawing the sheet from the roll;

a tension means mounted for applying a tension to the sheet as the sheet is fed through the nip between the main roller and the subroller in a direction opposite to the feeding direction, wherein the subroller has an axial length substantially shorter than the axial length of the main roller and also substantially shorter than a width of the film, and is located relative to a central portion of the main roller so that a nipping pressure is applied by the subroller at said central portion of the main roller, and whereby the sheet nipped between the main roller and the subroller is drawn from the roll of film by rotation of the main roller and against the applied tension without sideways drift and is fed in a direction selected to cause the sheet to make surface-to-surface curved peripheral contact with an outer surface of the subroller as the sheet is fed from the roll of film between the main roller and the subroller.

2. The sheet feeding device in accordance with claim 1, wherein:

the sheet is fed in a direction selected to cause the sheet to make surface-to-surface curved peripheral contact with an outer surface of the main roller.

3. A sheet feeding device in accordance with claim 1, further comprising:

a resiliently mounted rotary shaft supporting the subroller, whereby the subroller is biased toward the main roller to apply a nipping pressure to the sheet against the main roller.

4. A sheet feeding device in accordance with claim 1, further comprising:

light means for providing light directed to record on said sheet, wherein the sheet is a film suitable for recording thereon by exposure to said directed light from the light means.

5. A sheet feeding device in accordance with claim 4, wherein:

the sheet is to be exposed to said directed light from said light means while in said contact with the main roller.

6. A method for preventing sideways motion of a long sheet of film during continuous feeding thereof from a roll of film, comprising the steps of:

a) applying a back tension to the sheet;

b) feeding the sheet against the back tension in a direction substantially perpendicular to an axial direction of a controllably driven main roller while holding the sheet in a nip formed between the main roller and a subroller which is disposed so that an axis of the subroller is substantially parallel to an axis of the main roller; and c) applying a nipping pressure to the sheet by pressing the sheet against the main roller with the subroller, the subroller having an axial length substantially shorter than an axial length of the main roller and also substantially shorter than a width of the sheet, with the subroller disposed at a central portion of the relatively longer main roller and cooperating therewith so as to prevent sideways motion of the sheet relative to the main roller and the subroller;

whereby the sheet is fed from the roll of film solely by the main roller cooperating with the subroller in a direction such that the sheet makes surface-to-surface curved peripheral contact with an outer surface of the subroller as the sheet is fed from the roll of film between the main roller and the subroller.

7. A sheet feeding method in accordance with claim 6, further comprising:

a resiliently mounted rotary shaft supporting the subroller, whereby the subroller is biased toward the main roller to apply a nipping pressure to sheet against the main roller.

8. A sheet feeding method in accordance with claim 6, wherein:

the sheet is fed in a direction such that it makes surface-to-surface curved peripheral contact with an outer surface of the main roller.

9. A sheet feeding method in accordance with claim 6, wherein:

the sheet is a film for recording by light exposure.

10. The sheet feeding method in accordance with claim 9, wherein:

the sheet is exposed to directed light conveying information to be recorded for the recording by exposure thereby while the sheet is on the main roller.

* * * * *